Oct. 1, 1957 J. J. WALLACE Re. 24,364

SYSTEM FOR CLEANING GINNED COTTON PRIOR TO BALING

Original Filed May 13, 1955

INVENTOR

Jeffrey J. Wallace

BY Mason, Fenwick & Lawrence

ATTORNEYS

United States Patent Office

Re. 24,364
Reissued Oct. 1, 1957

24,364

SYSTEM FOR CLEANING GINNED COTTON PRIOR TO BALING

Jeffrey J. Wallace, Amite, La., assignor to Gullett Gin Company, Amite, La., a corporation of Louisiana Original No. 2,747,235, dated May 29, 1956, Serial No. 508,239, May 13, 1955. Application for reissue July 2, 1957, Serial No. 669,459

3 Claims. (Cl. 19—67)

Matter enclosed in heavy brackets [ ] appears in the original patent but forms no part of this reissue specification; matter printed in italics indicates the additions made by reissue.

This invention relates to a system for cleaning ginned cotton prior to baling, and to a cotton cleaner per se particularly designed to serve in said system.

The conventional precleaners individual to the gins are, in general, inadequate to clean dirty cotton such as that which is picked mechanically, so that supplemental cleaning following ginning is essential. This may be accomplished by providing each gin of the battery with an individual post-cleaner, or by providing a suitable single cleaner to take care of the aggregate output of the entire battery of gins. The latter alternative is the most practical, for the need for post-gin cleaning envisions the equipping of practically all gin plants now in being with supplementary cleaning apparatus, and aside from the prohibitive cost of individual cleaners, one for each gin, the layout of most plants is so crowded that there is no room for the installation of individual post-gin cleaners.

The prior art suggests the association of cleaning apparatus with the trunk lint flue at a point between the battery of gins to the battery condenser, but the presence of the fly trash which contaminates the vehicle air in the trunk lint flue creates a problem which is not encountered in the cleaning system contemplated by the present invention.

One of the objects of the invention is to provide a system which includes the conventional battery of gins equipped with precleaners, the trunk lint flue leading from the gins to the battery condenser, and, following the battery condenser but anterior to the press, a supplemental cleaner to which lint cotton from the battery condenser is supplied without vehicle air, the thus re-cleaned lint being conveyed in a vehicle of clean air to a supplemental condenser from which it is chuted or otherwise delivered to the press. Such a system would logically provide for the selective use of the supplemental cleaner or the bypassing of the same in cases in which the lint cotton from the gins is sufficiently clean to call for no further cleaning treatment.

Another object of the invention is the provision of a post-gin cleaner particularly designed to be integrated in a system such as above described.

A further object of the invention is the provision of a condenser unit per se, combining in a single compact structure the primary battery condenser, the supplementary condenser and the conduit connection between said condensers and the adjunctive instrumentalities of the system, including the selective means for utilizing both condensers or solely the battery condenser.

Other objects of the invention will appear as the following description of a practical embodiment thereof proceeds.

In the drawing which accompanies and forms a part of the following specification, and throughout the figures of which the same reference characters have been used to denote identical parts:

Figure 1:
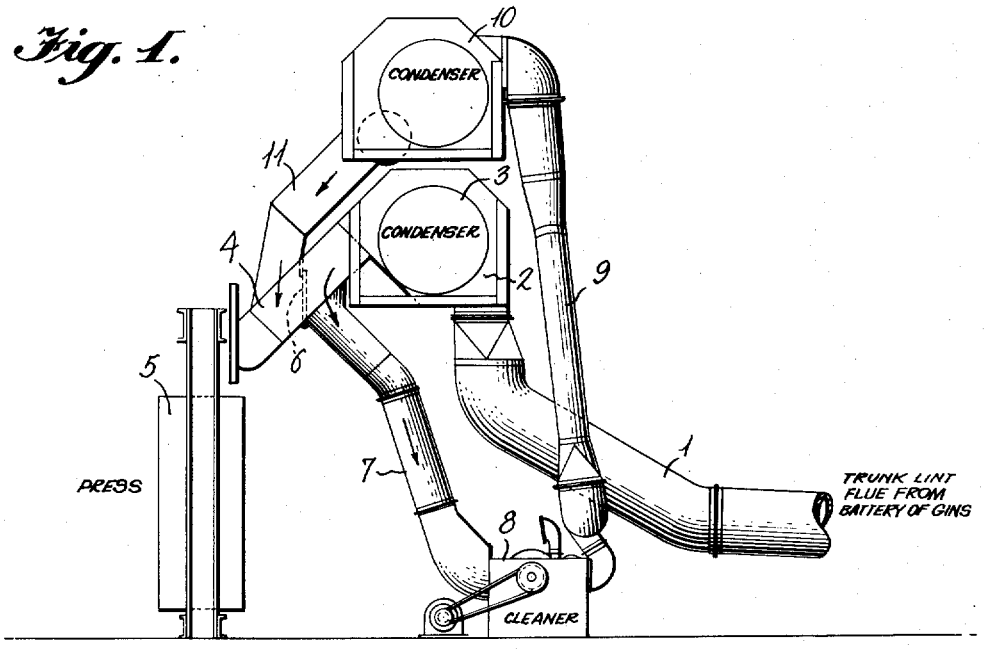
Figure 1 is a diagrammatic view in end elevation, illustrating the system of post-gin lint cleaning comprised in the present invention.

Referring now in detail to the drawing, the numeral 1 represents the trunk lint flue from a battery of gins, not shown, which delivers the lint to the battery condenser 2, which as shown, may be of the cylinder type, against the cylinder 3 of which the lint impinges as air is drawn through the perforated walls of the cylinder by suction means, not shown, but which is old in the art. In the conventional system the lint is scraped from the surface of the cylinder and chuted gravitationally through the chute 4 to the press 5. In the subject invention, the cotton may be diverted by shifting the valve 6 to the dotted line position shown, so as to flow through the bypass conduit 7 to the lint cleaner 8 of the present invention, where the cotton is subjected to supplemental cleaning, and then delivered in a column of clean vehicle air through the lint duct 9 to the supplemental condenser 10, which may be similar to the condenser 2. In this condenser the vehicle air is dissipated, the cotton scraped from the cylinder and chuted without the benefit of vehicle air, through the duct 11 into the chute 4 to the press.

In view of the fact that the cotton is delivered to the press without benefit of vehicle air, that is, ordinarily by gravity, both condensers are at a higher level than the press, and the supplemental condenser 10 is above the battery condenser 2.

Due to the restricted available space in the average gin plant, it may be preferred to combine the two condensers into a single unit with the connection substantially as shown in Figure 1.

Figure 2:
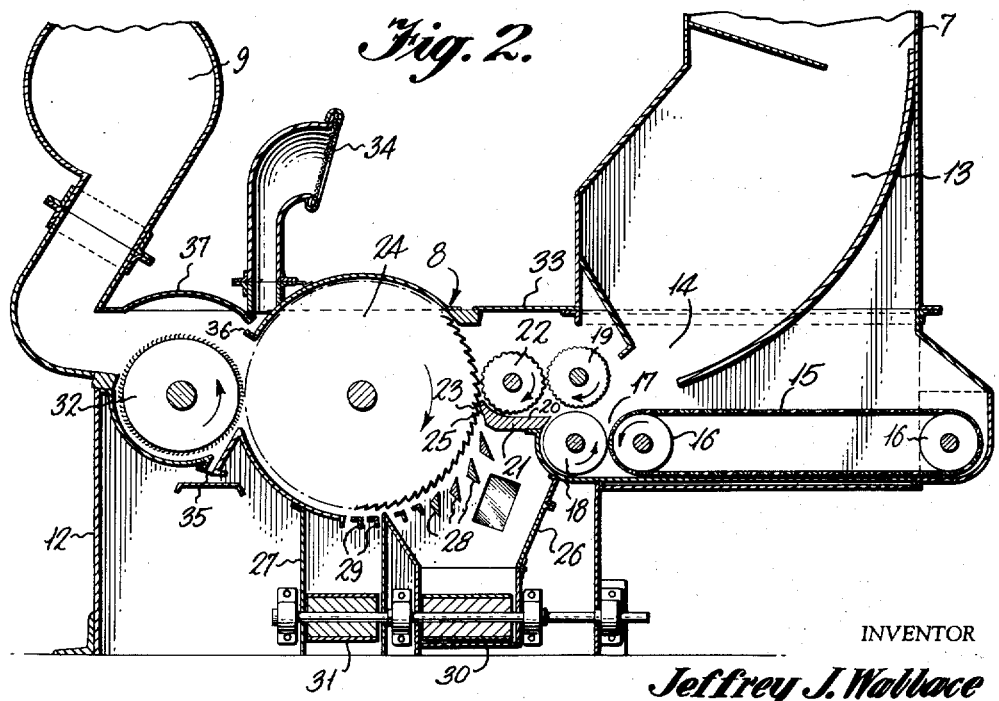
Figure 2 is a longitudinal vertical section through the supplemental lint cleaner.

Referring now to the details of construction of the lint cleaner 8, as shown in Figure 2, there is a casing 12 enclosing the various parts, having an inlet opening at the top right, as shown, with which the lower end of the conduit 7 communicates. It will be understood that the lower end of said conduit is expanded widthwise into a transition, the full width of the cotton handling elements of the cleaner. This transition is indicated at 13, and has a mouth 14 at its lower end, which overlies a slat conveyor 15 riding upon rollers 16, one of which is driven. The cotton covers the underlying portion of the conveyor 15 widthwise, and is carried by rotation of the conveyor into the space 17, between the smooth surfaced driven roll 18 and the adjacent end of the conveyor. The roll 18 rotates counterclockwise, as viewed in Figure 2, and creates movement among the flocks of cotton in the space 17, effecting some uniformity in the lateral distribution of the cotton in said space, and frictionally moving that part with which it comes into contact upwardly into nipping relation to the corrugated driven roll 19. The cotton is fed between the rolls 18 and 19, the latter roll travelling at a speed somewhat in excess of that of the roll 18, so that the cotton is drawn and compressed into a bat and moved onto the smooth upper surface 20 of a fixed feed plate 21 and into feeding relation with the corrugated surface of the driven roll 22. The shape of the forward portion of the surface 20 of the feed plate 21 substantially follows the curvature of the roll 22. The speed of rotation of the roll 22 is greater than that of the adjacent roll 19, so that the bat travelling against the surface 20 of the feed plate is still further drawn out, thinned, and made uniform and propelled in a forward direction until it flows over the nose 23 at the front of the plate 21. A toothed cylinder 24 rotates at high speed with its circumference in proximity to the nose 23, and draws the bat downward along the upper front face of the feed plate 21, the teeth of the cylinder 24 at the same time snatching cotton from the bat so that while it is continually fed over the nose 23 in the from of a bat, it terminates in a fringe against the front face 25 of the feed plate. The speed of rotation of the cylinder 24 is so great that only a few fibers are caught by each tooth, resulting in very thorough cleaning.

Below the lower arc of the toothed cylinder 24 the casing 12 is shaped so as to constitute two discharge hoppers 26 and 27, the first mentioned being closest to the feed plate 21, for receiving larger trash, while the other is for the smaller motes or trash. At the upper part of the hopper 26 and close to the circumference of the toothed cylinder 24 are a series of spaced cleaning bars 28. These are formed so as to present an acute angled edge in the path of the oncoming lint standing out centrifugally from the cylinder 24. The lint contacts the acute angled edges successively, the impact as well as the brushing contact of said edges with the lint, dislodging the trash, which falls into the hopper.

At the top of the hopper 27 there are a plurality of spaced bars 29 extending transversely across the cleaner differing from the bars 28 in that they present a right angled edge to the cotton on the cylinder 24, and therefore, act more gently upon the cotton, since the greater part of the trash has been removed by the bars 28 and the fibers conditioned by a sort of carding action imparted by their contact with the bars 28, so that they do not require so vigorous a treatment for the dislodgment of the smaller pin trash. In the lower parts of the hoppers 26 and 27 are drag belts, respectively 30 and 31, upon which the trash collects, and by which it is withdrawn from the hoppers and suitably discharged. The value of having two hoppers is that considerable lint may drop with the trash in the first hopper, which can later be separated from the trash by means which are not within the purview of the subject invention.

The cleaned cotton carried past the hopper 27 upon the teeth of the cylinder 23 encounters a doffing cylinder 32, which preferably is clothed with wire teeth bent at a reverse angle, the adjacent arcs of said toothed cylinder and doffing cylinder rotating in the same direction, but the doffing cylinder at a greater speed, so that the lint is removed from the cylinder 24 without becoming attached to the teeth of the doffing cylinder. The doffing cylinder is within the mouth portion of the lint duct 9. Said conduit has air inlets 34 and 35 above and below the point at which the doffing cylinder lies substantially tangent to the cylinder 24. The air inlet 34 terminates in an upturned nozzle 36, which induces an air blast blowing in the direction of movement of the upper arc of the doffing cylinder, and assisting in carrying cotton into the lint duct 9. The air inlet 35 forms a nozzle directed toward the point of tangency between the doffing cylinder and cylinder 24, and assists in removing the lint from the teeth of the latter cylinder. The casing 12 is provided with a door 33 above the bat, forming rolls, and a door 37 above the doffing cylinder 32.

While I have in the above description defined what I have found to be a practical embodiment of the invention, it will be understood by those skilled in the art that the specific details of construction and arrangement of parts, as shown, are by way of example and not to be construed as limiting the scope of the invention.

What I claim is:

1. System for post-gin cleaning of cotton comprising the following sequence of cotton handling instrumentalities in the following positional relationship, the trunk lint flue from a battery of gins, the battery condenser, the press, and a supplemental lint cleaner and supplemental condenser between said battery condenser and press, said supplemental lint cleaner being at low level, said battery condenser [being above said press] and said supplemental condenser being above said [battery condenser] *press*, said trunk lint flue being connected to said battery condenser, a downwardly inclined chute from said battery condenser to said press, a valve in said chute, a downwardly inclined chute from said supplemental condenser connected into said battery condenser chute at the pressward side of said valve and a downwardly inclined chute from said battery condenser to said supplemental lint cleaner at the opposite side of said valve, said valve being movable from a position closing communication between said battery condenser chute and the chute to said supplemental lint cleaner, to a position closing said battery condenser chute and opening the chute *to* [so] said supplemental lint cleaner, and a suction conduit from said supplemental lint cleaner to said supplemental condenser open to atmosphere at said supplemental lint cleaner.

2. Post-gin lint cleaning apparatus comprising a casing, an inlet thereto at the top adjacent one end adapted to receive cotton from a battery condenser without vehicle air, a bat-forming unit within said casing comprising cooperating driven rolls and a feed plate, a belt conveyor, a chute from said inlet having a discharge mouth above said conveyor, the latter delivering cotton from said chute to said bat-forming unit, certain of the rolls of said bat-forming unit coacting with said feed plate to push the bat continuously over the front end of said plate, a driven toothed cylinder within said casing having its forward arc adjacent the front end of said feed plate and rotatable downwardly with the teeth directed so as to pull the bat down against said front end and snatch fibers from said bat, adjacent respective coarse and fine trash hoppers beneath the lower arc of said toothed cylinder, the coarse trash hopper being adjacent said feed plate, arcuate series of cleaning bars extending across the mouths of said hoppers parallel to the axis of said toothed cylinder, positioned substantially contiguous to the periphery of said toothed cylinder, the bars across the coarse trash hopper having acute angled leading edges engageable with the cotton fibers extending from said toothed cylinder and those across the fine trash hopper having leading edges of larger angularity, drag belts at the bottoms of both hoppers, a doffing cylinder within said casing contiguous to said toothed cylinder at the side thereof opposite said feed plate, a suction flue surrounding said doffing cylinder adapted to be connected to a condenser, having air inlets at both sides of the point of tangency of said doffing cylinder and said toothed cylinder.

3. Lint cleaner comprising a casing, an inlet therein at the top adjacent one end, a conduit communicating with said inlet for delivering lint cotton to said cleaner, a bat-forming unit within said cleaner comprising a group of driven rolls and a feed plate, said group including a lower smooth roll, and above said smooth roll a pair of corrugated rolls laterally juxtaposed, one of which rotates close to the periphery of said smooth roll and the other of which rotates close to the upper surface of said feed plate, both providing spaces between which the bat passes and is reduced, a substantially horizontal belt type conveyor beneath said conduit for receiving cotton therefrom and delivering it to said bat-forming unit, the front end of said conveyor being laterally contiguous to said smooth roll forming therewith a cotton receiving trough from which cotton is elevated by said smooth roll to the overlying corrugated roll and passed by the latter to said feed plate, the other corrugated roll cooperating with said feed plate to continuously push the bat over the front end of said feed plate, a driven toothed cylinder within said casing peripherally substantially contiguous to the front edge of said feed plate for snatching fibers from the end of said bat, cleaning bars substantially contiguous to the toothed cylinder in its lower arc in the path of fibers standing out centrifugally from said toothed cylinder, a doffing cylinder within said casing substantially tangent to said toothed cylinder at the side thereof opposite said feed plate, and a suction flue surrounding said doffing cylinder adapted to lead to a condenser, and an air inlet for said suction flue adjacent the point of substantial tangency of said doffing cylinder to said toothed cylinder terminating in a nozzle constructed to direct incoming air past said doffing cylinder in the direction of rotation thereof.

References Cited in the file of this patent or the original patent

UNITED STATES PATENTS

| | | |
|---|---|---|
| 535,976 | Campbell | Mar. 19, 1895 |
| 2,129,312 | Streun | Sept. 6, 1938 |
| 2,639,468 | Streun | May 26, 1953 |
| 2,704,862 | Moss | Mar. 29, 1955 |